US006928349B1

(12) United States Patent
Namaky et al.

(10) Patent No.: US 6,928,349 B1
(45) Date of Patent: Aug. 9, 2005

(54) SCAN TOOL WITH DROPPED COMMUNICATIONS DETECTION AND RECOVERY AND IMPROVED PROTOCOL SELECTION

(75) Inventors: Hamid Namaky, South Russell, OH (US); Robert Charles Sheppard, Westlake, OH (US); Michael F. Gessner, Akron, OH (US); Thomas J. Bertosa, Mentor-On-The-Lake, OH (US); Robert A. Roberts, South Euclid, OH (US); Donald J. Rodemann, Lakewood, OH (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/676,614

(22) Filed: Oct. 1, 2003

Related U.S. Application Data

(63) Continuation of application No. 10/159,957, filed on May 31, 2002, now Pat. No. 6,701,233.

(60) Provisional application No. 60/385,084, filed on May 30, 2002, and provisional application No. 60/295,318, filed on Jun. 1, 2001.

(51) Int. Cl.[7] ............................................ G06F 19/00

(52) U.S. Cl. ............................................ 701/33

(58) Field of Search ............................................ 701/33

(56) References Cited

U.S. PATENT DOCUMENTS

| | | | | | |
|---|---|---|---|---|---|
| 6,526,340 | B1 | * | 2/2003 | Reul et al. | 701/29 |
| 6,701,233 | B2 | * | 3/2004 | Namaky et al. | 701/33 |
| 2002/0007237 | A1 | * | 1/2002 | Phung et al. | 701/33 |
| 2002/0070851 | A1 | * | 6/2002 | Raichle et al. | 340/438 |

* cited by examiner

*Primary Examiner*—Thomas G. Black
*Assistant Examiner*—Christine M. Behncke
(74) *Attorney, Agent, or Firm*—Baker & Hosterler LLP

(57) ABSTRACT

An improved scan tool, e.g., for OBD II, for use with vehicle computer networks. The improved scan tool determines the proper protocol to use to communicate with a vehicle computer network. The proper protocol is determined by requesting information from the vehicle computer network using a plurality of protocols and selecting the protocol that returns the most pieces of information. In addition, the improved scan tool determines a communications drop-out with one or more modules and automatically recovers from the communications drop-out.

23 Claims, 7 Drawing Sheets

SCAN TOOL WITH DROPPED COMMUNICATIONS DETECTION AND RECOVERY AND IMPROVED PROTOCOL SELECTION

This application is a continuation of U.S. Non-provisional application Ser. No. 10/159,957 filed on May 31, 2002, now U.S. Pat. No. 6,701,233, and entitled SCAN TOOL WITH DROPPED COMMUNICATIONS DETECTION AND RECOVERY AND IMPROVED PROTOCOL SELECTION, which is hereby incorporated by reference in its entirety. Non-Provisional Application Ser. No. 10/159,957 claims priority to U.S. Provisional Application Ser. No. 60/295,318, filed on Jun. 1, 2001, and entitled SCAN TOOL WITH DROPPED COMMUNICATIONS DETECTION AND RECOVERY AND IMPROVED PROTOCOL SELECTION, which is hereby incorporated by reference in its entirety. Non-Provisional Application Ser. No. 10/159,957 also claims priority to U.S. Provisional Application Ser. No. 60/385,084 filed May 30, 2002, also entitled SCAN TOOL WITH DROPPED COMMUNICATIONS DETECTION AND RECOVERY AND IMPROVED PROTOCOL SELECTION, and listing Messrs. Namaky, Sheppard, and Gessner as inventors, which is hereby incorporated by reference in its entirety.

FIELD OF THE INVENTION

The present invention relates generally to the field of electronic testing devices, and more specifically to an improved "off-board device," such as an OBD II scan tool, having dropped communications detection and recovery and further having improved protocol selection.

BACKGROUND OF THE INVENTION

"Off-board devices," such as scan tools, are known in the art and are testing devices that interface with vehicle diagnostic systems to access, display, and/or print vehicle diagnostic information. OBD II (On-Board Diagnostics version II) Scan Tools are one commonly known type of scan tool and are governed by a number of standards, e.g., SAE J1978 Rev. 1988-02 and SAE J1979 Rev. 1997-09.

There are a number of problems with the existing scan tools and scan tool specifications. For example, in certain vehicles, e.g., various model years of HYUNDAI, VW, DODGE, and VOLVO vehicles, the known scan tools have communications drop-outs. One minute the user will be using a scan tool and be examining e.g., 28 different parameters, and the next instant there is no response for all but e.g., three, of the parameters. What the user does not know is that one or more controllers, e.g., the engine controller, which is typically the main ODB II controller, has dropped out, leaving only a secondary controller, e.g., a transmission controller, talking with the scan tool. The known scan tools must begin the entire session over again, which can take half a minute or more and must be prompted by the user. As another example, sometimes following the specifications for determining the proper protocol does not result in using the protocol that provides the most relevant information (e.g., the most emissions information). Following the specifications, a scan tool might select a protocol that ends up with far less emissions data than another protocol.

More specifically, protocol determination is automatic (hands off) determination of which communication protocol the vehicle is using for the OBD II functions. Some vehicles have multiple modules and these modules may use different communication protocols. But only one of these protocols contains all the OBD II information for the vehicle. Therefore, the scan tool must be able to determine which protocol is the correct one to use for OBD II purposes. This automatic determination is specified in a SAE J1978. Furthermore in section 6.4.1 and 6.4.2 the SAE has spelled out a procedure for trying the four (4) protocols and determining which one is the OBD II protocol supported by the vehicle to relate the appropriate functions. In section 6.4.1 the specification spells out that only one protocol is allowed to be used in any one vehicle to access all the supported OBD II functions. This does not mean than a vehicle cannot support more that one protocol, but that only one may be used as the OBD II link. The SAE has published a suggested method for determining the OBD II protocol in J1978 section 6.4.2.

Through on-vehicle testing the inventors of the present invention discovered that this recommended way has flaws: one ends up selecting the wrong protocol as the OBD II link. Therefore a scan tool following the recommendation is unable to determine the correct protocol and therefore unable to use all the covered OBD II functions and read all the available information from the vehicle. One of the vehicles in question, for example, is one that supports both ISO 9141-2 (ISO) and ISO 14230-4 (Keyword 2000). The engine control module uses ISO 14230-4 as its protocol and the transaxle control module uses ISO 9141-2. The engine controller is the module that supports the OBD H functions for the vehicle. But the SAE suggested procedure directs that one test for ISO 9141-2 first and if one receives a reply, then that was the protocol to use for the link. It is the same with ISO 14230-4, if it replies. This causes the scan tool to incorrectly choose the protocol being used by the transaxle as the OBD II protocol for this type of vehicle rather than the protocol being used by the engine controller. Now that the scan tool is using the wrong protocol, ISO 9141-4, it is only talking to the transaxle controller. The engine controller (and all the emissions information it has to offer) is not found. This type of problem can happen in other protocol combinations also.

Also, certain vehicles employ multiple modules that communicate using the same protocol. This type of system is subject to one or more of the modules to losing their active communication with off-board devices, like scan tools. If the scan tool does not realize that one or more of the modules has dropped the link, it will not be showing complete/correct data.

Once again during on-vehicle testing the inventors discovered that multiple module vehicles present certain problems. For example certain VW models that use an engine control module and a transaxle control module presented a problem. After determining the OBD II protocol and initializing both modules for communications, it was noticed that one or the other module would occasionally stop communicating. This problem could be seen while requesting information on several functions, such as the "View Data" function (also known as the "Live Data" function). For example, user might notice during one View Data session that two modules report the state of the Malfunction Indicator Lamp ("MIL") and might notice on a subsequent View Data session on the same vehicle that only one module reports the MIL's state. The MIL's state from the other modules is now unknown. What happened is that, unknown to the user, one of the controllers dropped the communications link, so it did not respond to the request for the state of the MIL. These problems can result in OBD II information being misreported.

There is a need, therefore, for an improved scan tool.

SUMMARY OF THE INVENTION

The present invention is directed toward an improved "off-board device." In one embodiment, the "off-board device" of the present invention is a scan tool. According to one aspect of the present invention, the improved scan tool uses a novel method of determining the proper protocol to use to communicate with a vehicle computer network. According to another aspect of the present invention, the improved scan tool determines and automatically recovers from a communications drop-out. The scan tool of the present invention preferably, but not necessarily, includes both the novel method of determining the proper protocol to use to communicate with a vehicle computer network and the determination and automatic recovery from a communications drop-out.

It is therefore an advantage of the present invention to provide an improved scan tool that determines the protocol that provides the most relevant vehicle information (e.g., the protocol that provides the most emissions information).

It is also an advantage of the present invention to provide an improved scan tool that determines when a module has had a communications drop-out.

It is another advantage of the present invention to provide an improved scan tool that automatically recovers from a communications drop-out.

It is a further advantage of this invention to provide an improved scan tool that automatically recovers from a communications drop-out without requiring that the protocol be re-determined.

It is yet another advantage of the present invention to provide an improved scan tool that determines when a module has had a communications drop-out and that automatically recovers from a communications drop-out.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention, wherein.

DETAILED DESCRIPTION OF THE INVENTION

Figure 1:
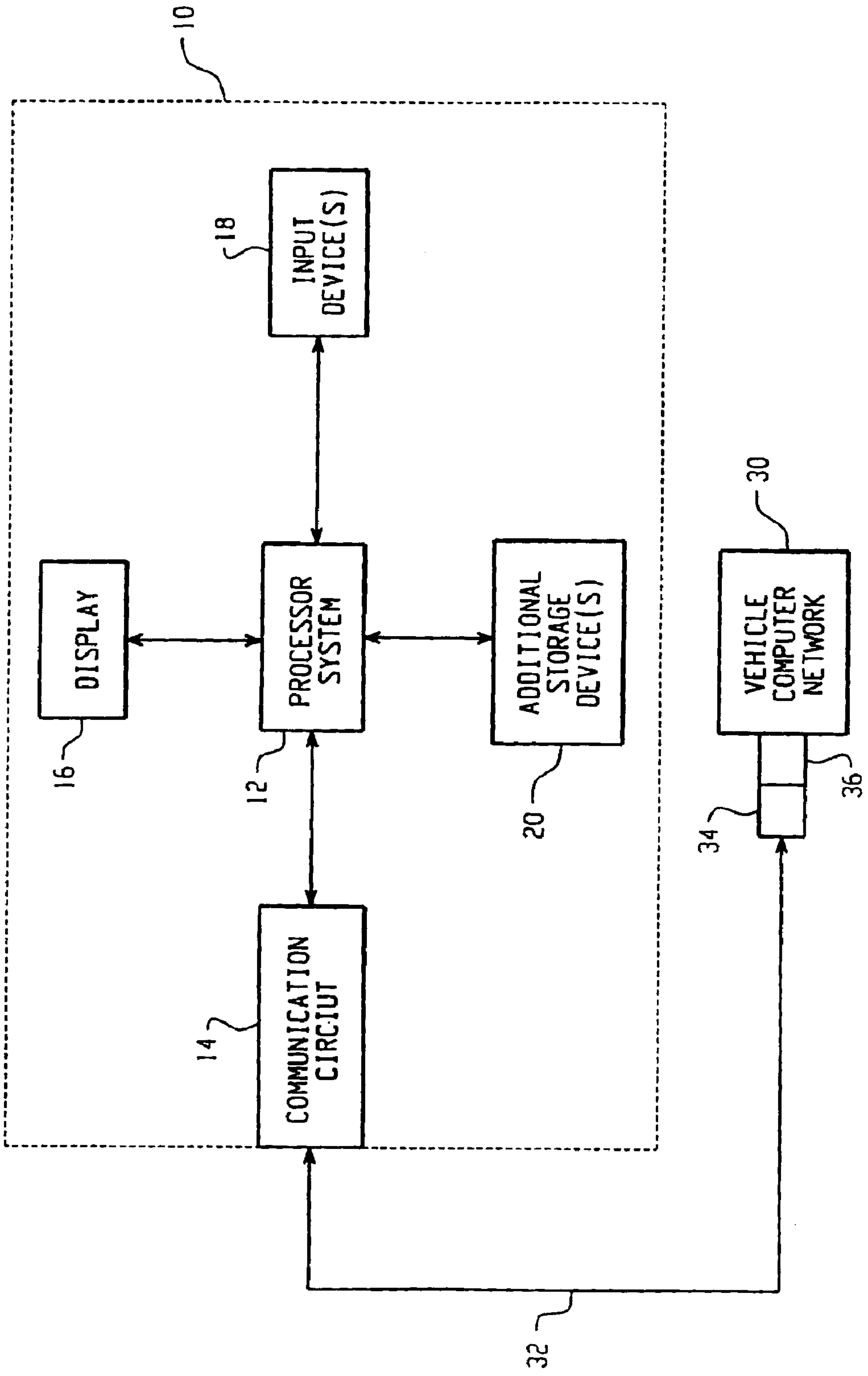
FIG. 1 is a high-level block diagram of a scan tool according to the present invention.

Referring to FIG. 1, a high-level block diagram of both a typical scan tool and a scan tool 10 of the present invention is shown. Such a scan tool 10 comprises a processor system 12 in circuit communication with a communication circuit 14, a display 16, one or more input devices 18, and optional additional storage device(s) 20.

"Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, e.g., a CPU, are in circuit communication. Also, as used herein, voltages and values representing digitized voltages are considered to be equivalent for the purposes of this application and thus the term "voltage" as used herein refers to either a signal, or a value in a processor representing a signal, or a value in a processor determined from a value representing a signal.

The scan tool 10 is placed in circuit communication with a vehicle computer network 30 having one or more interconnected computers ("modules") via a connection link carried by a communication cable 32. The connection cable 32 typically has a connector 34 affixed thereto that connects to a mating connector 36 in circuit communication with the vehicle computer network 30.

Figure 2:
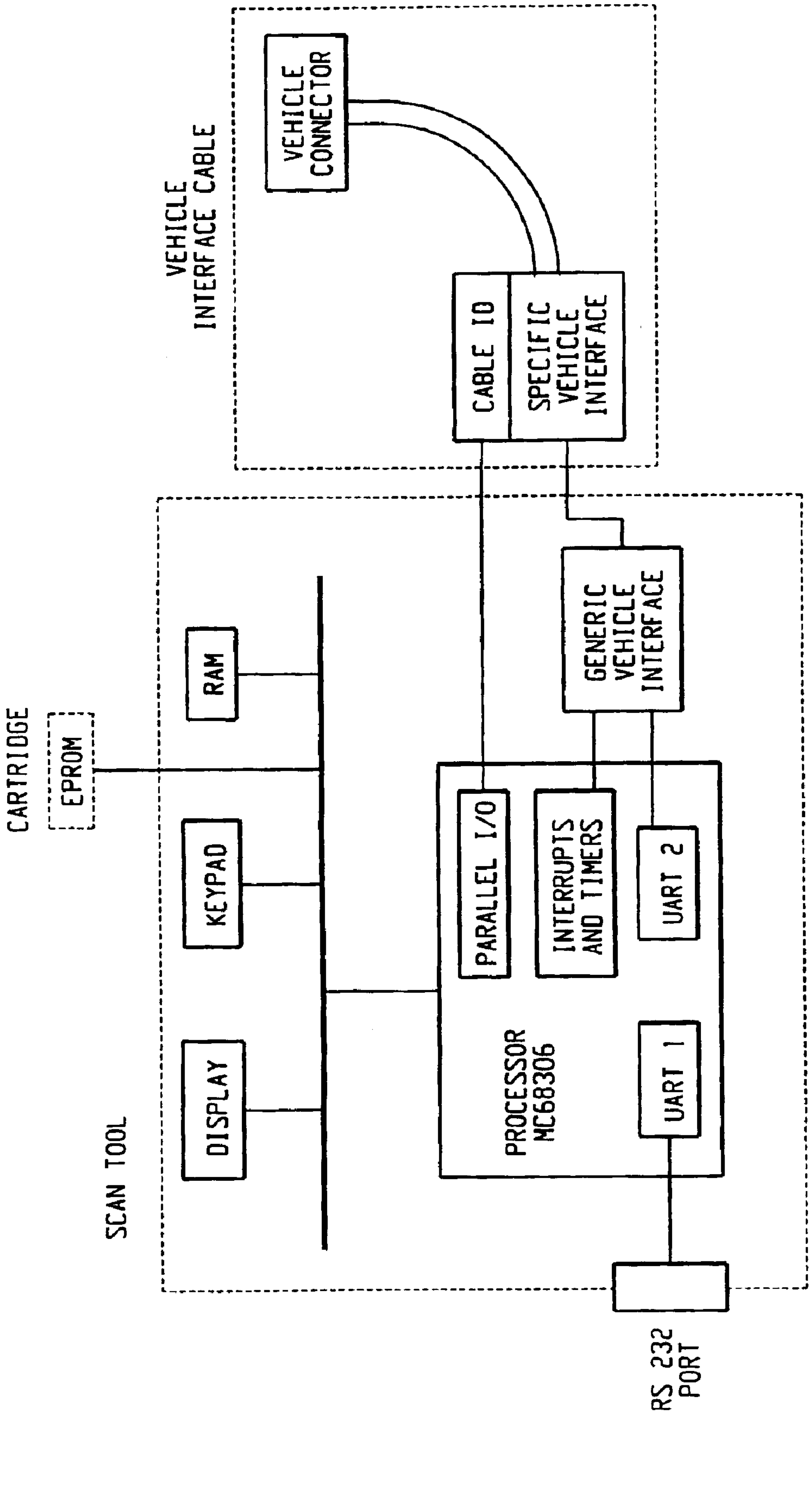
FIG. 2 is a block diagram of a specific implementation of a scan tool according to the present invention.

The processor circuit 12, also referred to herein as just processor 12, may be one of virtually any number of processor systems and/or stand-alone processors, such as microprocessors, microcontrollers, and digital signal processors, and has associated therewith, either internally therein or externally in circuit communication therewith, associated RAM, ROM, EPROM, clocks, decoders, memory controllers, and/or interrupt controllers, etc. (all not shown) known to those in the art to be needed to implement a processor circuit. FIG. 2 shows a high-level block diagram of an exemplary scan tool using an MC68306 processor to implement a scan tool having a generic vehicle interface and a specific vehicle interface, and a cartridge EPROM.

The communications circuit 14 typically generates one or more communications protocols with which the scan tool 10 and the vehicle computer network 30 communicate with one-another. The communications circuit 14 can be implemented either in hardware, or in software, or in a combination of hardware and software. Typical communications protocols generated by the communication circuit 14 of scan tools include but are not limited to: SAE J1850 (VPW), SAE J1850 (PWM), ISO 9141-2, and ISO 14230-4 ("Keyword 2000"). The present invention is not intended to be limited to any specific protocol, or even to electrical communications protocols. Other present and future protocols, such as fiber optic and wireless communications protocols, are also contemplated as being within the scope of the present invention. The display 16 can be one or more of virtually any type of display, e.g., textual displays (such as n character by m line LCD or plasma displays, etc.), binary displays (such as LEDs, lamps, etc.), graphical displays (such as LCD displays that can display text and bar graphs and the like), etc. The input device(s) typically comprise one or more keys or a keyboard, but may be one or more of virtually any type of input device, such as touch screens, etc. The optional additional storage device(s) 20 can comprise, for example, cartridge memories (such as those containing EPROM, EEPROM, or Flash PROM memories), cartridge memories, PC cards, stick memories (such as SONY brand MEMORY STICK packaged memory semiconductors), so-called floppy diskettes, etc.

The processor 12 typically executes a computer program stored in its RAM, ROM, Flash memory, and/or its EPROM (all not shown) and/or stored in any of the additional storage device(s) 20, using data stored in any one or more of those memories. For example, the processor 12 may execute a computer program from a ROM (not shown) using data (e.g., codes) stored in a cartridge memory 20. In general, the computer program executed by the processor in typical scan tools initializes the scan tool and generates a user interface (e.g., using the input device(s) 18), through which a user causes the scan tool to communicate with the vehicle computer network 30 to read certain data from the vehicle computer network 30, format such read data, and display the formatted data on the display 16. At this high level, the scan tool 10 according to the present invention works the same: the computer program executed by the processor 12 initializes the scan tool 10 and generates a user interface (e.g., using the input device(s) 18), through which a user causes the scan tool 10 to communicate with the vehicle computer network 30 to read certain data from the vehicle computer network 30, format such read data, and display the formatted data on the display 16. A fundamental difference in the present invention is how the scan tool 10 of the present invention selects a protocol through which it communicates with the vehicle computer network 30. Another fundamental difference is how the scan tool 10 of the present invention detects and recovers from a dropped communications link.

Figure 3:
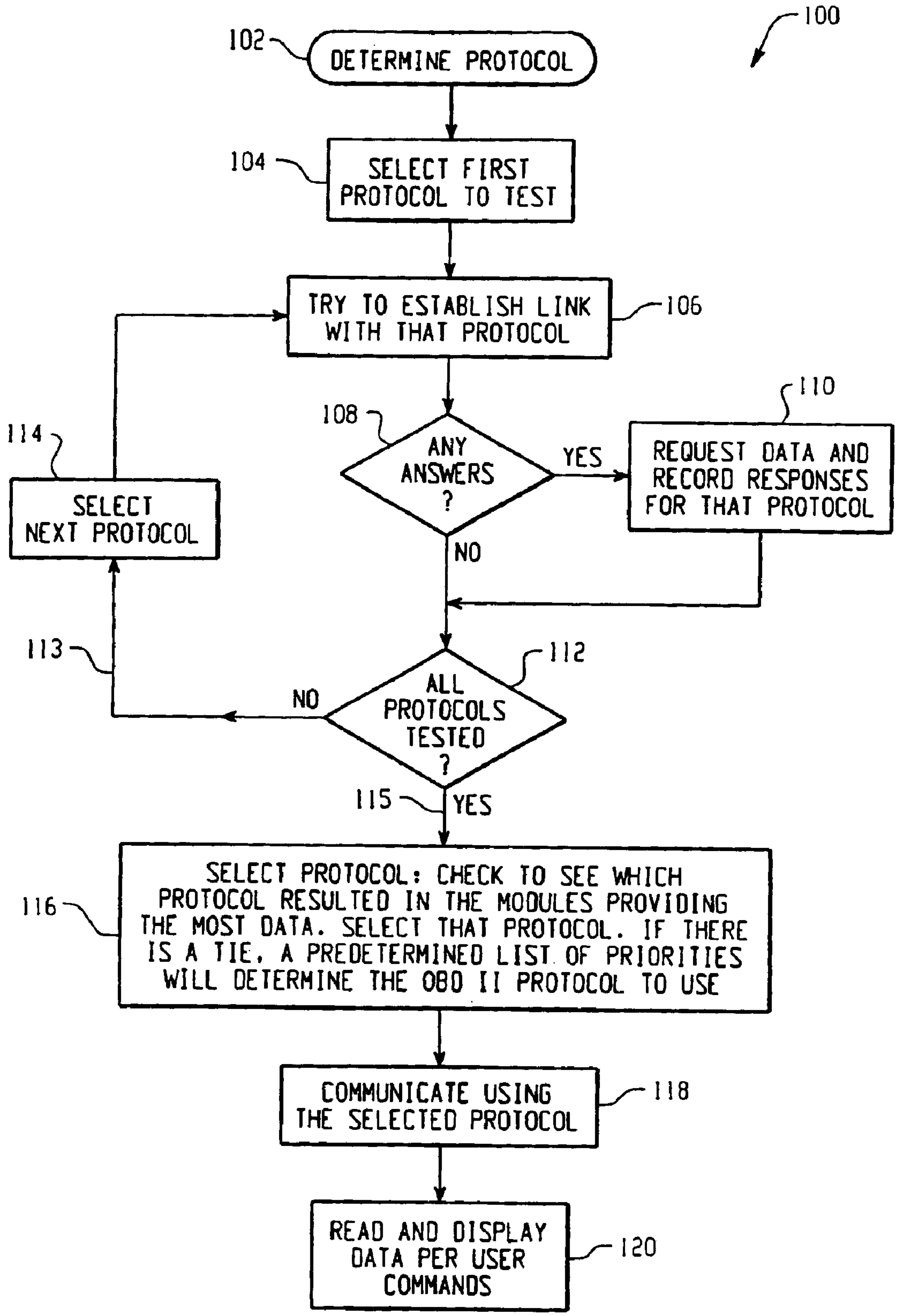
FIGS. 3–7 are flow charts showing the novel methods used by the scan tool of the present invention to select the proper protocol, determine whether a communications drop-out has occurred, and recover from a communications drop-out.

Referring now to FIG. 3, a high-level flow chart 100 showing the code executed by processor 12 to determine the proper communications protocol with the vehicle computer network 30 is shown. In general, the protocol determining routine of the present invention determines which protocol results in the most relevant data (e.g., the most OBD II emissions data) being available to the scan tool 10 from the vehicle computer network 30 and selects that protocol as the protocol to use. This necessarily involves checking all (or at least many) of the available protocols (or merely selected protocols) and not merely using the first protocol with which the scan tool establishes a communications link with the vehicle computer network 30. Of course, the scan tool 10 must be connected to the vehicle computer network 30 via a suitable cable 32 or other communications medium, e.g., fiber optic or wireless medium. The code begins at step 102. First, at step 104, a first protocol is selected. In the case of an ODB II scan tool according to the present invention, the first protocol to test might be the SAE J1850 (PWM) protocol. Next, at 106, the processor 12 causes the communications circuit 14 to attempt to establish a communications link with the vehicle computer network 30 using the first protocol. If any modules answer, at step 108, the processor 12 causes the communications circuit 14 to request data from the module(s) using the first protocol, at 110. The data, if any, transmitted by the module(s) is stored by protocol and module. More specifically to an OBD II scan tool according to the present invention, at step 110, a request that will result in most if not all of the modules responding (such as a Mode 1 PID 0 request, or a Mode 1 PID 1 request) is issued and the number of pieces of information (in the case of a Mode 1 PID 0 request, the supported PIDs; in the case of a Mode 1 PID 1 request, the number of "monitors") for all the modules is stored for that protocol. Then, or if no modules responded at test 108, the code tests, at step 112, whether all the protocols have been tested. If not, the code branches at 113 to step 114, where another communications protocol is selected to be tested. The protocols can either be tested in a predetermined fashion, or a random fashion, or a combination of predetermined and random. Then the code executes again from step 106 through step 112 with the next protocol until all the protocols (or selected protocols) have been tested. If none of the protocols generated a response from any modules, then the code preferably informs the user of this fact and provides the user with guidance and a number of options, as discussed below in the text accompanying tasks 338 and 426. If one of the protocols did generate a response from a module, then the code branches at 115 to step 116 where the requested data is analyzed to determine which protocol should be used. In general, the protocol resulting in the most pieces of relevant data being available or transmitted is selected. If there is a tie, a predetermined list of priorities, such as those provided in the OBD II specifications or those predetermined by some other means, can be used to break the tie. For example, suppose that the vehicle computer network 30 responds to a Mode 1 PID 1 request by reporting 7 monitors for the ISO protocol and by reporting 8 monitors for the Keyword 2000 protocol; the Keyword 2000 protocol would be chosen. Supposing that the vehicle computer network 30 responds to a Mode 1 PID 1 request by reporting 7 monitors for the ISO protocol and by reporting 7 monitors for the Keyword 2000 protocol; the ISO protocol would be selected, because that protocol takes precedence over the Keyword 2000 in the specifications. Thereafter, the communications circuit 14 communicates with the vehicle computer network 30 using that selected protocol, as shown at task 18. As shown at step 120, the scan tool 10 then reads and displays data from the vehicle computer network 30 in response to user commands, using the selected protocol.

Another important aspect of the present invention is how the scan tool 10 of the present invention handles communications drop-outs. In general, the present invention determines whether a module has dropped out or has merely ignored a request for data. Additionally, after a communications drop-out is detected, the present invention preferably communicates with the vehicle computer network 30 using the protocol determined by the code shown in FIG. 3. The scan tool 10 preferably does not re-determine the proper protocol after a drop-out. The resulting time-savings of half a minute-or-so might seem to be trivial, but to a user it can be significant, especially in a situation when communication drop-outs are frequent.

Figure 4:
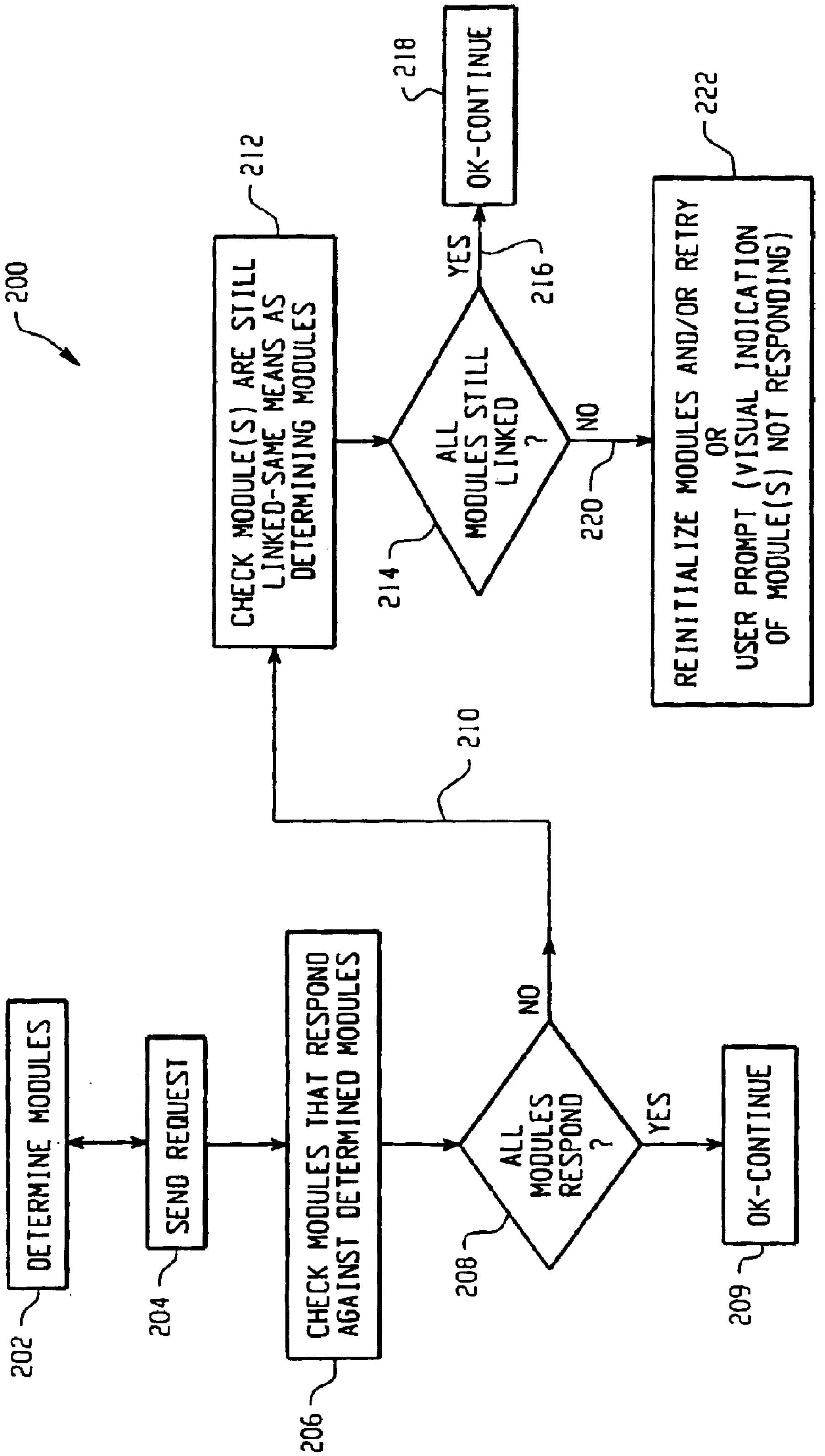

Referring now to FIG. 4, a high-level flow chart 200 showing the code executed by processor 12 to determine a communications drop-out and recover therefrom is shown. The code begins at 202 with the scan tool 10 of the present invention determining how many modules respond to the protocol (e.g., OBD II protocol) being used and stores the IDs of the modules. Then whenever requesting data or communicating with the vehicle computer network 30, such as at task 204, the scan tool 10 checks to be sure that all the modules that previously responded at step 202 answer the request, at 206. If all of the modules answer, at 208, then there has been no communications dropout and the code branches and can continue at 209 either accessing more data or displaying the data, etc. On the other hand, if at 208 one or more of the previously identified modules does not respond, the code next determines whether that specific module lost the link or whether that module merely ignored the request issued at step 204, e.g., that module does not support the request sent. On the one hand, if the scan tool 10 determines that the module that did not respond is still communicating via that protocol, the scan tool 10 of the present invention assumes that that module merely ignored the request, e.g., it does not support the request. On the other hand, if the non-responsive module is also not communicating in response to more basic requests, then the scan tool 10 of the present invention concludes that there has been a communications drop-out. More specific to FIG. 4, if at 208 one or more of the previously identified modules does not respond, the code branches at 210 to step 212, where the code checks and determines again which modules are still linked, preferably using exactly the same method as used in step 202. In the context of an OBD II scan tool according to the present invention, if a Mode 1 PID 0 request was issued at step 202, then a Mode 1 PID 0 request is preferably also issued at step 212. If at 214 the same modules are still linked in response to the request issued at step 212 as were linked at step 202, then there has been no communications drop-out and the code branches at 216, and can continue at 218 either accessing more data or displaying the data, etc. On the other hand, if at 214 the same modules are not still linked in response to the request issued at step 212 as were linked at step 202, then there has been a communications drop-out and the code branches at 220, where the code responds to a communications drop-out at 222. At 222, a number of things can be done, such as re-initializing the communications link and/or trying the request at step 204 again. Trying the request at step 204 again should not be repeated indefinitely, or the code might end up in an endless loop (as might happen, e.g., if the transmitted communication/request at 204 was causing one or more of the modules to stop communicating). Also the physical connection or power to the modules might have been lost, causing one or more modules to stop linking. Therefore, eventually, it should be reported to the user that the scan tool 10 has detected a communications drop-out, as shown at 222.

Figure 5:
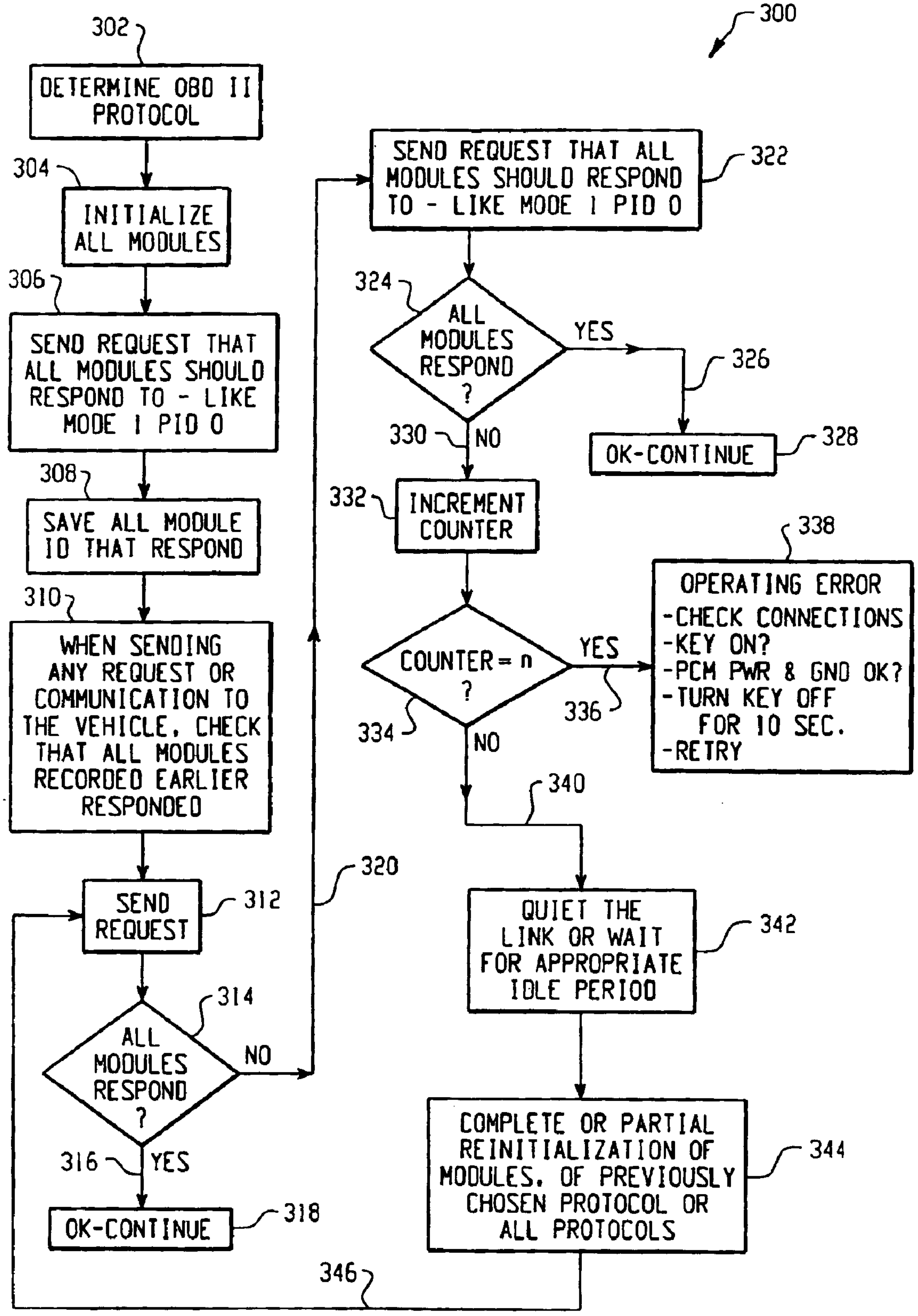

The code shown in flowchart form in FIG. 4 is intended to be relatively general. An example of code more specifically tailored to an OBD II environment 300 is shown in FIG. 5. Referring to that Figure, the code 300 begins at 302 with the processor 12 determining the protocol to use as taught in FIG. 3 and the text accompanying that Figure. If the protocol has previously been selected, then the process can skip to task 310. (As should be apparent, the protocol need not be determined each time the user uses the device 10 to request information from the vehicle computer network 30, i.e., steps 302–308 are preferably done once each time the device 10 is connected to the vehicle computer network 30, with subsequent accesses being done at 312 using the protocol previously determined at 302 and the baseline determined at 308.) Next, at 304, the processor 12 initializes all modules in the network 30 using the selected protocol. Then at 306, the processor causes the communications circuit 14 to send a request that all modules in the network 30 should respond to, such as a Mode 1 PID 0 request. Then the processor saves the IDs. of the modules that respond to the request, at 308. Then at task 310 whenever requesting data or communicating with the vehicle computer network 30, such as at task 312, the scan tool 10 checks to be sure that all the modules that previously responded at step 308 answer the request, at 314. If all of the modules answer, at 314, then there has been no communications drop-out and the code branches at 316 and can continue at 318 either accessing more data or displaying the data, etc. On the other hand, if at 314 one or more of the previously identified modules does not does not respond to the request issued at 312, the code next determines whether that specific module lost the link or whether that module merely ignored the request issued at step 204, e.g., that module does not support the request sent. If the scan tool 10 determines that the module that did not respond is still communicating via that protocol, the scan tool 10 assumes that that module merely ignored the request, e.g., it does not support the request. If the non-responsive module is also not communicating in response to more basic requests, then the scan tool 10 concludes that there has been a communications drop-out. More specific to FIG. 5, if at 314 one or more of the previously identified modules does not respond, the code branches at 320 to step 322, where the code checks and determines again which modules are still linked, preferably using exactly the same method as used in step 306, e.g., by issuing a Mode 1 PID 0 request. If at step 324 the same modules are still linked in response to the request issued at step 322 as were linked at step 308, then there has been no communications drop-out and the code branches at 326, and can continue at 328 either accessing more data or displaying the data, etc. On the other hand, if at 324 the same modules are not still linked in response to the request issued at step 322 as were linked at step 308, then there has been a communications drop-out and the code branches at 330, where the code increments a counter (previously zeroed) at 332. If at 334 the counter has reached a predetermined threshold, e.g., three (3), then the code branches at 336 and user is advised of the situation at 338 (because there have been n (e.g., three) unsuccessful attempts at communicating with that module). The user is preferably prompted to do one or more of the following: check the physical connections (e.g., the connection between connectors 34, 36), ensure that the ignition key is on, ensure that the PCM power and ground are OK, turn the ignition key off for ten seconds or so, and restart the entire process. If at 334 the counter is less than the predetermined number, the scan tool 10 of the present invention does one or more of the following things to try to automatically respond to the communications drop-out, such as quieting the link or waiting for an idle period of time (e.g., on the order of from about 8 to about 10 seconds) at 342 and attempting to perform a complete or partial initialization of the modules via the selected protocol (or possibly reinitializing all the protocols) at 344. In either event, the code branches at 346 to attempt the same request again, preferably using the same protocol determined at step 302 without re-determining the protocol.

Figure 6:
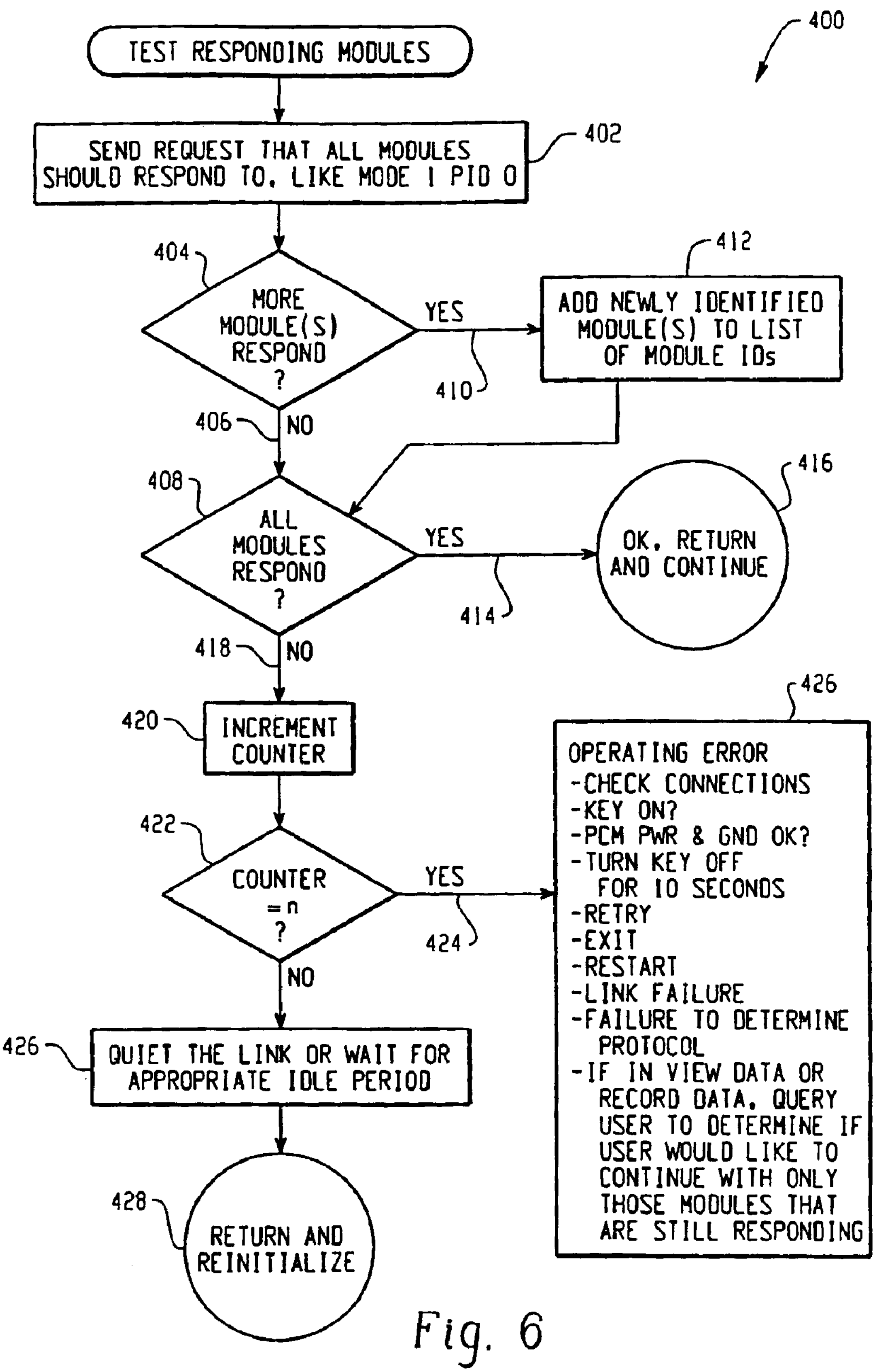
Figure 7:
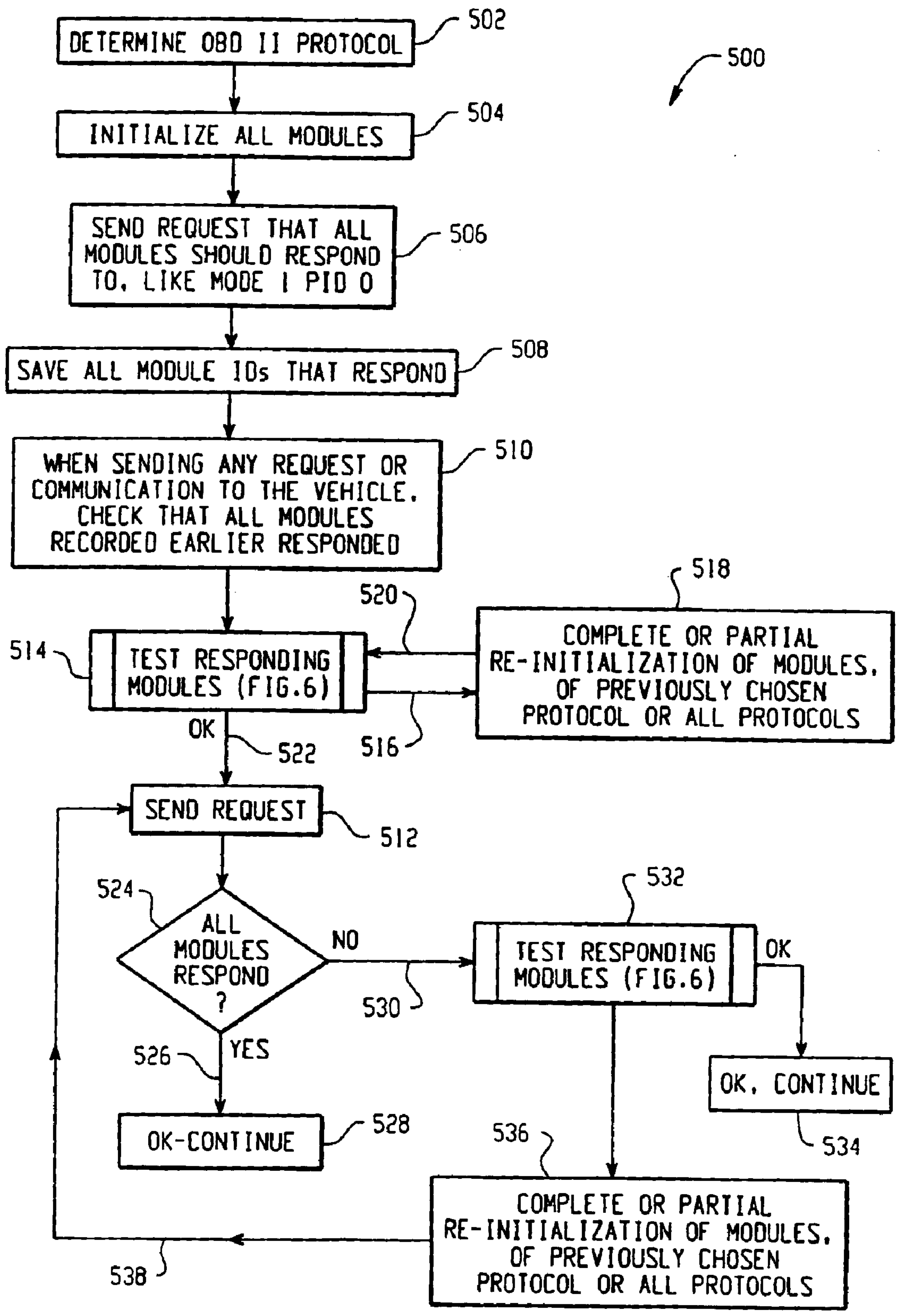

Another example of code specifically tailored to an OBD II environment is shown in FIGS. 6–7. More specifically, FIG. 6 shows a code subroutine that is used in FIG. 7. In this examples, a more basic request is issued to test whether there has been a communications dropout, and whether any additional modules have linked, before sending a more specific request. Referring first to FIG. 6, the subroutine 400 shown is essentially steps 322 through 342 of FIG. 5, with an additional test 404 to see if any more modules responded than had previously responded. The code 400 begins at step 402 where the code checks and determines again which modules are still linked, preferably using exactly the same method as used in step 506, e.g., by issuing a Mode 1 PID 0 request. Next, at 404, the code determines whether any additional modules have linked to the device 10. If at step 404 the same modules are still linked in response to the request issued at step 402 as were linked at step 508, then no additional modules have linked and the code branches at 406, and can continue at 408 with a test to see if any modules have been dropped. On the other hand, if at 404 one or more additional modules have linked to the device 10 than were linked at step 508, then the code branches at 410, where the code adds the module IDs of the newly linked modules to the list of module IDs previously generated and continues to step 408. At step 408, the code determines whether any modules have dropped their communication link with the device 10 by comparing the list of devices responding to the request issued at step 402 to the list of module IDs that was previously generated at step 508 and possibly modified at step 412. If so, then there has been no communications drop-out and the code branches at 414, and returns at 416 and can continue either accessing more data or displaying the data, etc. On the other hand, if at 408 the same modules are not still linked in response to the request issued at step 402, then there has been a communications drop-out and the code branches at 418, where the code increments a counter (previously zeroed) at 420. This counter is tested at 422 and if the counter has reached a predetermined threshold, e.g., three (3), then the code branches at 424 and user is advised of the situation at 426 (i.e., there was a failure to determine a protocol because none of the protocols of FIG. 3 resulted in a module providing any data or there has been a link failure because there have been n (e.g., three) unsuccessful attempts at communicating with that module). The user is then preferably prompted to do one or more of the following: check the physical connections (e.g., the connection between connectors 34, 36), ensure that the ignition key is on, ensure that the PCM power and ground are OK, turn the ignition key off for ten seconds or so, and restart the entire process. The user is also preferably given the option of exiting or restarting the process. If the user was using either View Data or Live Data, then the user is preferably given the option of continuing the View data or Record Data with only the modules that are responding. The value of n that triggers user intervention could be user-selectable, as could the counter at 332 that is tested at 334. If at 422 the counter is less than the predetermined number, the scan tool 10 of the present invention does one or more of the following things to try to automatically respond to the communications drop-out, such as quieting the link or waiting for an idle period of time (e.g., on the order of from about 8 to about 10 seconds) at 426 and returning at 428 to attempt to perform a complete or partial initialization of the modules via the selected protocol (or possibly reinitializing all the protocols).

The example of FIG. 7 is intended to be used in modes where data is repeatedly acquired from the vehicle computer network, such as with the View Data (also known as Live Data) and Record Data functions. Referring now to FIG. 7, the code 500 begins at 502 with the processor 12 determining the protocol to use as taught in FIG. 3 and the text accompanying that Figure. If the protocol has previously been selected, then the process can skip to task 510. (As should be apparent, the protocol need not be determined each time the user uses the device 10 to request information from the vehicle computer network 30, i.e., steps 502–508 are preferably done once each time the device 10 is connected to the vehicle computer network 30, with subsequent accesses being done at 512 using the protocol previously determined at 502 and the baseline determined at 508, possibly modified at 412.) Next, at 504, the processor 12 initializes all modules in the network 30 using the selected protocol. Then at 506, the processor causes the communications circuit 14 to send a request that all modules in the network 30 should respond to, such as a Mode 1 PID 0 request. Then the processor saves the IDs of the modules that respond to the request, at 508. Then at task 510 whenever requesting data or communicating with the vehicle computer network 30, such as at task 512, the scan tool 10 checks to be sure that all the modules that previously responded at step 508 (possibly modified at step 412 of FIG. 6) answer the request, at 512. However, prior to sending a request at 512, the code tests whether all of the previously identified modules are still responding, at 514, by executing the subroutine of FIG. 6. If the routine of FIG. 6 returns via task 428, then at least one module has lost its communications link and the code continues at 516 to task 518, where the code attempts to perform a complete or partial initialization of the modules via the selected protocol (or possibly reinitializing all the protocols). In either event, the code branches at 520 to attempt the same test again, preferably using the same protocol determined at step 502 without redetermining the protocol. If at 514 the routine of FIG. 6 returns via task 416, then the code continues at 522 to send a request at 512. If all of the modules answer, at 524, then there has been no communications drop-out and the code branches at 526 and can continue at 528 either accessing more data or displaying the data, etc. On the other hand, if at 524 one or more of the previously identified modules does not does not respond to the request issued at 512, the code branches at 530 and next determines whether that specific module lost the link or whether that module merely ignored the request issued at step 512, e.g., that module does not support the request sent, by re-executing the routine of FIG. 6, at 532. If the scan tool 10 determines that the module that did not respond is still communicating via that protocol, i.e., the routine of FIG. 6 returns via task 416, the scan tool 10 assumes that that module merely ignored the request, e.g., it does not support the request, and the code continues at 534 either accessing more data or displaying the data, etc. If the non-responsive module is also not communicating in response to more basic requests, i.e., the routine of FIG. 6 returns via task 428, then the scan tool 10 concludes that there has been a communications drop-out and the code continues via 535 to task 536 to perform a complete or partial initialization of the modules via the selected protocol (or possibly reinitializing all the protocols). In either event, the code branches at 538 to attempt the same request again, preferably using the same protocol determined at step 502 without re-determining the protocol. As discussed above, the example of FIG. 7 is intended to be used in modes where data is repeatedly acquired from the vehicle computer network. As with FIG. 5, the code of FIG. 7 can be used with functions that use a one-time access. Preferably, however, only a subset of the code of FIG. 7 is used for functions involving a one-time access of the vehicle computer network 30, such as reading diagnostic trouble codes (DTCs), reading oxygen monitors, reading any pending codes, erasing codes, reading vehicle information, etc. In the case of these one-time accesses, one preferably uses only tasks 502 through 522, and uses whatever data is returned in response to the request at task 512, without performing the functions of tasks 524 through 536.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art, for example, using fiber optic or wireless protocols. Of course, in the OBD II context, a Mode 1 PID 0 request need not be used; other codes might flush out the available modules and monitors. As another example, the teachings of the present invention are not limited to scan tools, per se. They can, for example, be implemented in other off-board devices, such as in PC-based emissions and maintenance test systems, such as those found at many state EPA testing centers and in end-of-line testers used by automobile manufacturers. Therefore, the invention in its broader aspects is not limited to the specific details, representative apparatus and methods, and illustrative examples shown and described. Accordingly, departures may be made from such details without departing from the spirit or scope of the applicant's general inventive concept.

We claim:

1. A method of operating an off-board device to communicate with a diagnostic system of a vehicle, the diagnostic system having one or more modules, comprising the steps of:

(a) determining a number of pieces of information received from one or more modules using a first communications protocol;

(b) determining a number of pieces of information received from the one or more modules using a second communications protocol; and (c) selecting from the plurality of communications protocols a communications protocol to use for communications between the off-board device and the diagnostic system using at least the number of pieces of information received from the one or more modules using the first communications protocol and the number of pieces of information received from the one or more modules using the second communications protocol.

2. The method of claim 1 further comprising:

(a) requesting data from one or more of the diagnostic system modules using a first communications protocol;

(b) waiting a selected length of time;

(c) requesting data from the one or more of the diagnostic system modules using a second communications protocol upon expiration of the selected length of time.

3. The method of claim 1 wherein the pieces of information are indicative of monitors.

4. The method of claim 1 wherein the pieces of information are indicative of trouble codes.

5. The method of claim 1 further comprising establishing a link with the diagnostic system using the selected communications protocol.

6. The method of claim 5 further comprising sending a request using the selected communications protocol to the vehicle diagnostic system and comparing the number of pieces of information received in response to the request from the one or more modules to the number of pieces of information previously received from a similar request from the one or more modules.

7. The method of claim 6 further comprising determining whether one or more modules has stopped communicating with the off-board device as a function of the comparison of the number of pieces of information received in response to the request from the one or more modules to the number of pieces of information previously received from a similar request from the one or more modules.

8. The method of claim 7 further comprising re-establishing the communications link with the diagnostic system using the selected communications protocol.

9. The method of claim 1 wherein the first communications protocol is an SAE J1850 communications protocol.

10. The method of claim 1 wherein the first communications protocol is an ISO 9141-2 communications protocol.

11. The method of claim 1 wherein the first communications protocol is an ISO 14230-4 communications protocol.

12. The method of claim 1 wherein the first communications protocol is a CAN communications protocol.

13. The method of claim 1 wherein the first communications protocol is a wireless communications protocol.

14. The method of claim 1 wherein the second communications protocol is an SAE J1850 communications protocol.

15. The method of claim 1 wherein the second communications protocol is an ISO 9141-2 communications protocol.

16. The method of claim 1 wherein the second communications protocol is an ISO 14230-4 communications protocol.

17. The method of claim 1 wherein the second communications protocol is a CAN communications protocol.

18. The method of claim 1 wherein the second communications protocol is a wireless communications protocol.

19. The method of claim 1 wherein the pieces of information received are indicative of the identities of the one or more modules that responded to the request.

20. The method of claim 1 wherein selecting from the plurality of communications protocols is a function of the most number of pieces of information received from the one or more modules.

21. The method of claim 1 wherein selecting from the plurality of communications protocols is a function of the least number of pieces of information received from the one or more modules.

22. The method of claim 1 further comprising storing the number of pieces of information received from the one or more modules using the first communications protocol.

23. The method of claim 1 further comprising storing the number of pieces of information received from the one or more modules using the second communications protocol.

* * * * *